Nov. 21, 1967 R. KULKA 3,354,295

BINARY COUNTER

Filed June 29, 1964 3 Sheets-Sheet 1

INVENTOR
RAYMOND KULKA

BY John F. Ostendorf

ATTORNEY

United States Patent Office 3,354,295
Patented Nov. 21, 1967

3,354,295

BINARY COUNTER

Raymond Kulka, Wappingers Falls, N.Y., assignor to International Business Machines Corporation, New York, N.Y., a corporation of New York Filed June 29, 1964, Ser. No. 378,851
6 Claims. (Cl. 235—92)

ABSTRACT OF THE DISCLOSURE

Binary counting apparatus is provided which eliminates the time required for the propagation of a carry through the counter. Each counter stage of the counter includes first and second binary circuits each responsive to a source of pulses operable alternately with respect to the other. Each first binary circuit also responds to its immediately preceding second binary circuit and each second binary circuit is responsive to all of the preceding first binary circuits. In this way, the indication of the count provided by the first binary circuit is independent of any pulse propagation through the counter.

This invention relates to digital computer circuits and, more particularly, to a binary counter that is operable in high speed manner.

In the development of present day digital computers, efforts are being concentrated on obtaining greater machine versatility at less expense. Since machine versatility is controlled to a large extent by the speed capabilities of the computer's components, developmental endeavors are being directed at obtaining increased operating speeds. This factor is particularly true in the control and arithmetic portions of a machine which employ counting circuits.

Most binary counters operate in a serial manner. Their operating time is slow and directly related to a finite period of time required for a pulse supplied to the first stage of the counter to propagate through all other stages by serially triggering each of them. Thus, such counters do not lend themselves for use in high speed computing applications.

Accordingly, it is a primary object of the invention to provide an improved binary counter operable in high speed manner.

It is another object of the invention to provide a binary counter in which the count is rendered independent of any pulse propagation through the counter.

Another object of the invention is to provide a binary counter operable with minimum delay in response to a minimum number of input pulse trains.

A further object of the invention is to provide a binary counter capable of accepting presetting input signals enabling the counter to operate as a step down or step up counter.

Briefly, according to one feature of the invention, the foregoing objects are accomplished by providing a plurality of counter stages connected in cascade. Each stage comprises a pair of binary storage circuits with appropriate logical circuits for performing count and carry functions. The binary storage circuits are connected such that each count storage circuit is a function of the immediately preceding lower ordered carry circuit. Each carry circuit, in turn, operates as a function of all the lower ordered count circuits. In this way, the carry portion of the counter is cumulatively set by one pulse. The count stored in the counter is rendered independent of any pulse propagation through the counter.

According to another feature of the invention, additional setting or resetting input pulse trains may be supplied to the storage circuit of the counter to preset it to any predetermined desired count value.

The foregoing and other objects, features and advantages of the invention will be apparent from the following more particular description of the preferred embodiments of the invention, as illustrated in the accompanying drawings, wherein.

Figure 1:
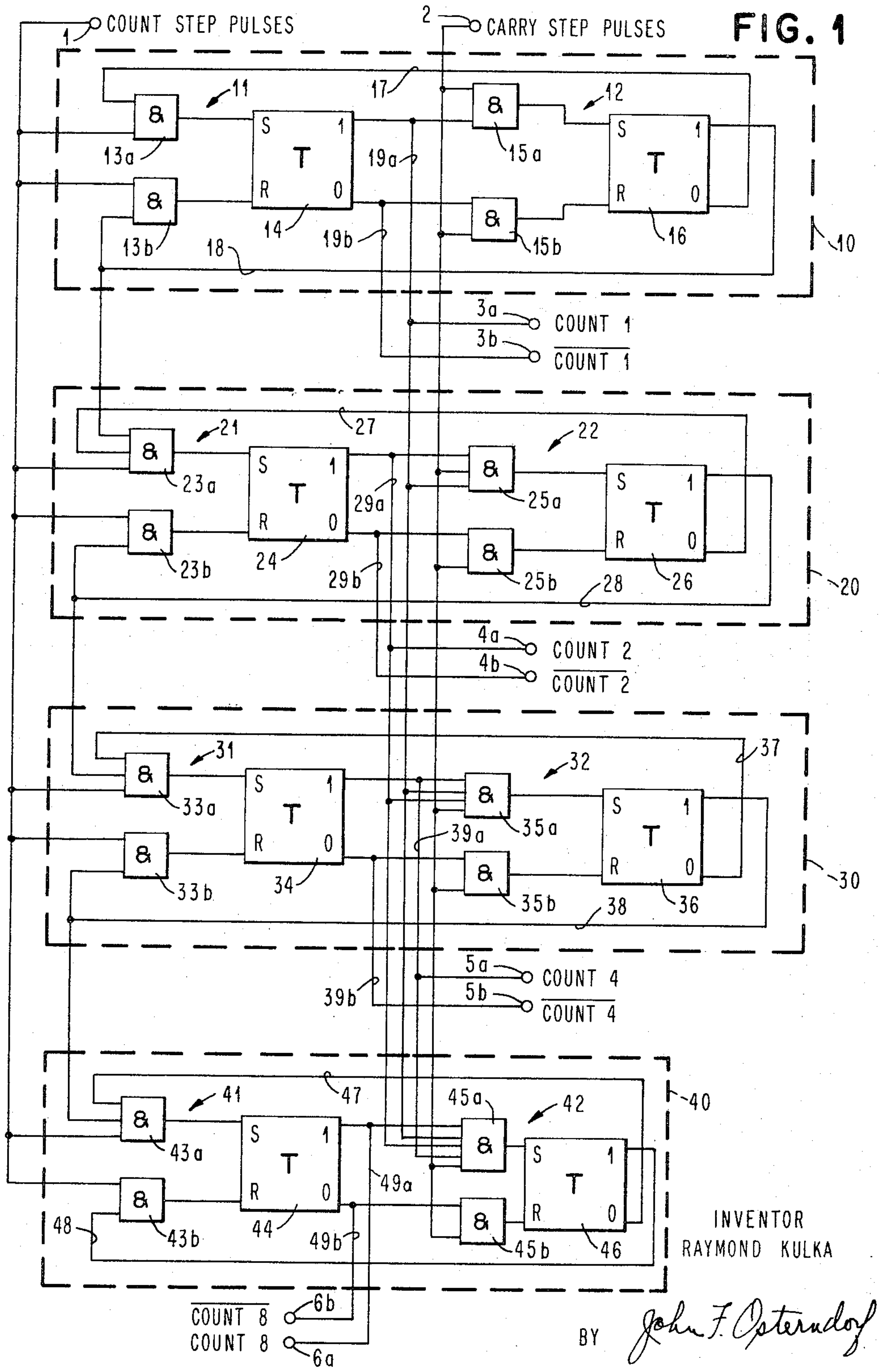
FIGURE 1 is a block diagram of a plurality of orders of a counter embodying the principles of the invention.

Referring now to FIGURE 1, the principles of the invention are embodied in a counter in which four stages are illustrated in dashed line block form at 10, 20, 30 and 40. Each stage of the counter includes a count storage circuit generally indicated at 11, 21, 31 and 41, respectively, and a carry storage circuit generally indicated at 12, 22, 32 and 42, respectively.

Figure 2:
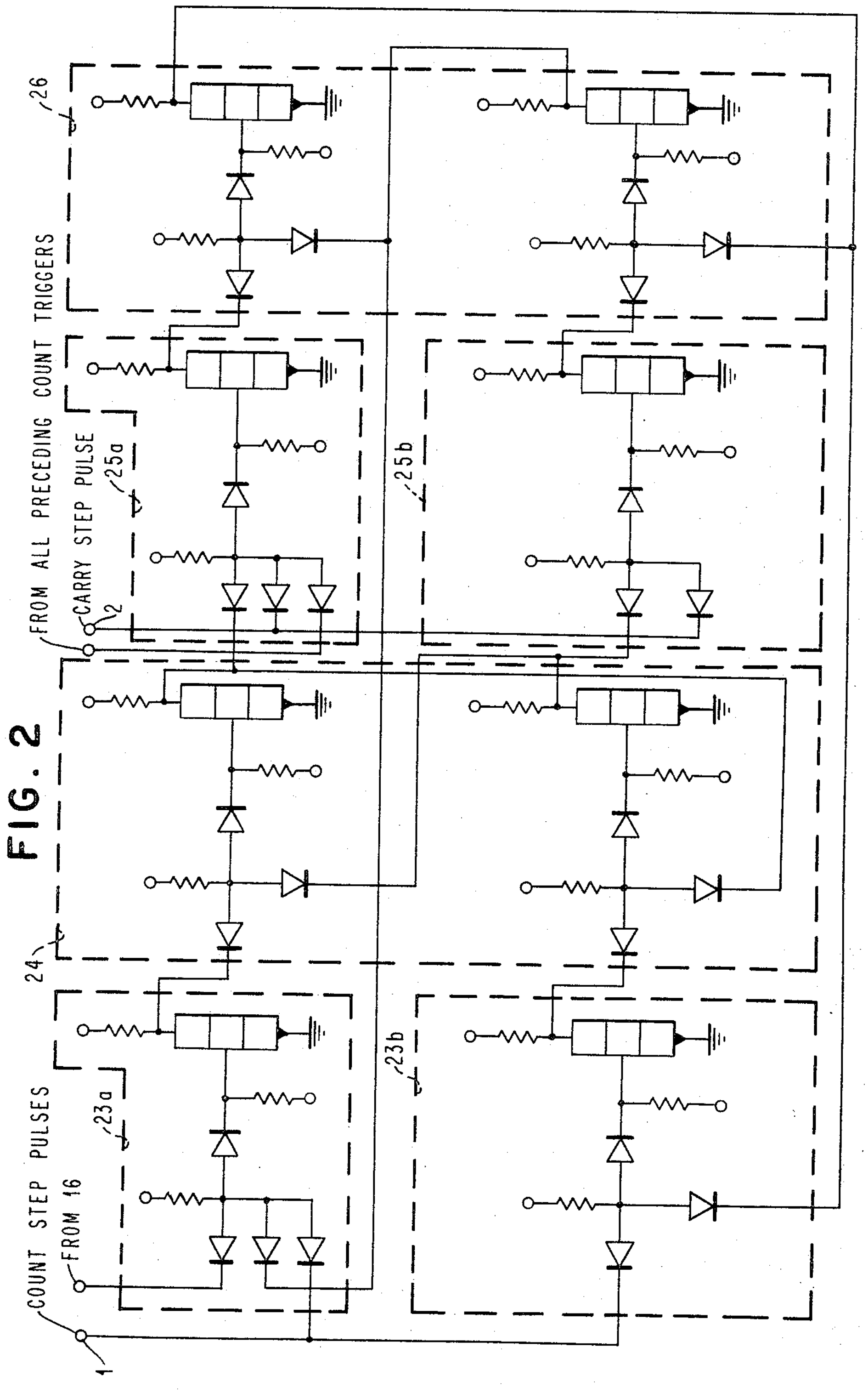
FIGURE 2 is a circuit schematic of one stage of the counter of FIGURE 1 employing a particular circuit.

Each storage circuit comprises a pair of AND logical gates and a binary trigger circuit, e.g., the circuit 11 includes the AND gates 13*a* and 13*b* and the trigger 14. Similarly, the carry storage circuit 12 includes the AND gates 15*a* and 15*b* and the trigger 16. The AND gates are conventional in nature and the triggers may take the form of any bistable circuit. A particular logical gate and trigger circuit arrangement which may be employed in the counter of the invention is shown in FIGURE 2 and described more fully hereinafter.

The counter is adapted to receive two independent trains of pulses illustrated as the count step pulse train supplied to an input terminal 1 and a carry step pulse train supplied to the input terminal 2. As will be described more fully hereinafter, the pulses from these trains occur alternately and only one occurs at a particular time. Therefore, they can be supplied from any suitable bistable circuit which provides a dual output.

The count step pulse train is supplied to each of the AND gates of the count storage circuits, such as 13*a*, 13*b*, 23*a*, 23*b*, etc. The carry step pulse train is supplied in like manner to each of the AND gates of the carry storage circuits at 15*a*, 15*b*, 25*a*, 25*b*, etc.

The outputs of the triggers of the count storage circuits are supplied as inputs to the carry storage circuits and the outputs of the triggers of the carry storage circuits are cross-connected and supplied as reset inputs to the AND circuits of the count storage circuits. Thus, the lines connected from the ON and OFF outputs of the trigger 16 of counter stage 10 are connected through 17 and 18, respectively, to the inputs of the storage circuit 11 at the AND gates 13*a* and 13*b*, respectively. In similar manner, the ON output from the trigger 16 is supplied to the AND gate 23*a* connected to the set input of the trigger 24 of the next count storage circuit 21. In this way, each count storage circuit responds to the output of the immediately preceding carry storage circuit. A similar connection is made from the trigger 26 through the line 28 to the AND gate 33*a* of count storage circuit 31 and from the trigger 36 through the line 38 to the AND gate 43*a* of count storage circuit 41. The connections from a carry trigger circuit back to the count storage circuit (e.g., the connections 27 and 28 to the trigger 24 through AND gates 23*a* and 23*b*) serve to reset the trigger of this circuit on the next succeeding count step pulse.

Each of the AND gates 15*a*, 25*a*, 35*a* and 45*a* in each of the carry storage circuits 12, 22, 32 and 42 also receives an input from the ON output of each of the triggers of all the preceding count storage circuits. Thus, AND gate 25*a* in counter stage 20 is connected through the line 19*a* to the ON output of the trigger 14 and AND gate 35*a* of counter stage 30 is connected to the ON outputs of the triggers 14 and 24 through the lines 19*a* and 29*a*, respectively. Also, the AND gate 45*a* of the counter stage 40 is connected through the lines 19*a*, 29*a* and 39*a* to the triggers 14, 24 and 34, respectively.

The connection of each carry storage circuit to all of the preceding counter storage circuits permits the counter to operate with a minimum amount of delay. It enables it to operate without waiting for a single count pulse to ripple through the entire counter. The carry is propagated through the counter independently of the count that is accumulated in the count storage circuits of the counter stages 10, 20, 30 and 40. It is this series of connections of carry storage circuits to all preceding count storage circuits along with the connection of each count storage circuit to its immediately preceding carry storage circuit which renders this counter operable in faster time than other types of counter circuits.

The count from the counter is provided at the terminals 3*a*, 4*a*, 5*a* and 6*a* from the ON outputs of the triggers 14, 24, 34 and 44 of the count storage circuits. Similarly, the complement of the count is supplied from the OFF outputs of these triggers at the terminals 3*b*, 4*b*, 5*b* and 6*b*. As shown at the terminals 3*a*–6*a*, the binary counts 1, 2, 4 and 8 are supplied. If additional stages are added to the counter then the outputs would proceed in a binary progression as 16, 32, etc.

As previously mentioned, the circuitry employed for the storage circuits may be conventional in nature and the trigger may be any suitable form of binary storage circuit. One example of a suitable circuit is shown in FIGURE 2 wherein the logic is performed by diode AND gates and transistor inverters and the storage function is performed by diode logic and transistor inverters.

Thus, if the counter stage 20 is illustrated in FIGURE 2, the AND gates 23*a*, 23*b*, 25*a*, 25*b* are formed of diode AND logic circuits and transistor inverters. The AND gates 23*a* and 23*b* are connected to receive count step pulses and the AND gates 25*a* and 25*b* are connected to receive carry step pulses. The AND gate 23*a* is also connected to the preceding carry storage circuit 16 and the AND gate 25*a* is connected to all preceding count storage circuits. The trigger circuits 24 and 26 are connected to the outputs of the circuits 23*a*, 23*b* and 25*a*, 25*b*, respectively. They may employ diode logic and transistor inverter circuits which are cross-coupled together to perform the storage functions.

Figure 3:
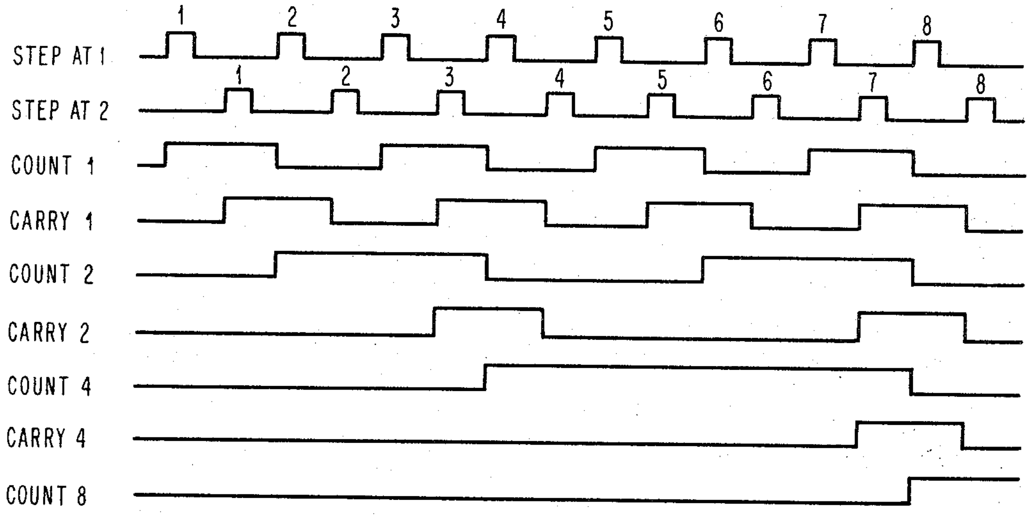
FIGURE 3 is a timing diagram illustrating the operation of the counter of FIGURE 1.

In operation, the count step pulses are supplied at the terminal 1 to each of the AND gates of the count storage circuits 11, 21, 31 and 41 and the carry step pulses are supplied at the terminal 2 to each of the AND gates of the carry storage circuit 12, 22, 32 and 42. As shown in the timing diagram of FIGURE 3, when the first count step pulse is supplied, it turns on the count 1 trigger (trigger 14) through the AND gate 13. Gate 13 had previously been enabled by the positive level signal supplied through the line 17 indicating the OFF condition of trigger 16. An indication of the count 1 is therefore provided through the line 19*a* at the terminal 3*a*. The AND gate 13*a* is therefore enabled, the AND gate 13*b* is disabled and the trigger 14 is in the ON condition. The AND gates 15*a* and 15*b* are both disabled and the trigger 16 is in the OFF condition.

When the first carry step pulse is supplied to the AND gates 15*a* and 15*b*, the AND gate 15*a* accepts the output of trigger 14 and is enabled by the carry step pulse to set trigger 16 to the ON condition which disables the gates 13*a* and 13*b*. When the second count step pulse is supplied at terminal 1, the gate 13*b* is enabled as a positive output is supplied through the line 18 from the ON output of the trigger 16. This resets the trigger 14 and the output at the terminal 3*a* drops to its negative level.

Concurrently, the signal supplied through the line 18 is also supplied to AND gate 23*a*. Gate 23*a* is enabled by the OFF output signal from the trigger 26 and the second count step pulse so that trigger 24 is put in the set condition. An output signal is also provided through line 29*a* at the terminal 4*a* indicating a count of 2.

When the second carry step pulse is supplied at terminal 2, it causes trigger 16 to be reset to the OFF condition through the AND gate 15*b* as the trigger 14 was already placed in the OFF condition by the second count step pulse. When count step pulse 3 is supplied, it turns on the count 1 storage circuit providing an output at terminal 3*a*. The count 2 output at terminal 4*a* remains the same as the trigger 24 does not change state.

When the third carry step pulse is supplied, it turns ON the carry storage circuit 12 through the AND gate 15*a* (trigger 14 is in the set state). The carry storage circuit 22 is also placed in the ON condition through the AND gate 25*a* since enabling signals are provided from the trigger 24 which is in the ON or set state and through the line 19*a* from the trigger 14.

At the time that count step pulse 4 is supplied to the circuit, the count storage circuits 11 and 21 and the carry storage circuits 12 and 22 are all in the ON condition. This pulse causes the triggers 14 and 24 to be reset through the AND gates 13*b* and 23*b* and the outputs at the terminals 3*a* and 4*a* to drop to their negative level. however, the trigger 34 of counter stage 30 is enabled through AND gate 33*a* since the trigger 36 is in the reset or OFF state and the trigger 26 of the preceding counter stage is in the set or ON state. The output at terminal 5*a* rises to indicate a count of four from the counter.

When carry step pulse 4 is supplied to the counter, the carry storage circuits 12 and 22 are disabled through the AND gates 15*b* and 25*b*, because the triggers 14 and 24 had previously been reset to the OFF condition by the fourth count step pulse.

When the fifth count step pulse is supplied to the circuit, it turns ON the count storage circuit 11 providing an output at terminal 3*a* indicating the count 1. This count along with the count 4 present at terminal 5*a* indicates the count of 5. With the count storage circuit 11 ON, the application of the fifth carry step pulse at terminal 2 puts the carry storage circuit 12 in the ON condition. The trigger 14 is prepared to be reset to the OFF condition and the trigger 24 to be set to the ON condition when the next count step pulse is supplied. Thus, when the sixth count step pulse is supplied, the count storage circuit 11 is turned OFF and the count storage circuit 21 is turned ON indicating at terminal 4*a* the presence of the count 2 at the same time the count 4 is provided at the terminal 5*a*.

With the application of the sixth carry step pulse at terminal 2, trigger 16 is reset to the OFF condition through the AND gate 15*b* by the carry step pulse and the output from trigger 14. When the seventh count step pulse and seventh carry step pulse are supplied to the circuit they serve to turn ON the count storage circuit 11 and the carry storage circuit 12, respectively. Thus, at the terminals 3*a*, 4*a* and 5*a* an output is provided indicating in binary form the count of 7.

In preparation for the eighth count step pulse, all of the triggers 14, 24 and 34 and 16, 26 and 36 are set to the ON condition and the count storage circuit 41 is prepared to switch to the ON condition. When count step pulse 8 is applied, it turns OFF triggers 14, 24 and 34 through the AND gates 13*b*, 23*b* and 33*b*, respectively, and turns ON trigger 44 through AND gate 43*a*. The count of 8 is indicated at the terminal 6*a*. When the eighth carry step pulse is applied to the circuit, it turns the carry storage circuits 12, 22 and 32 OFF through the AND gates 15*b*, 25*b*, 35*b*, respectively.

In similar manner, the count can be increased to higher binary orders by adding additional counter stages which are connected in the same manner as those illustrated in FIGURE 1. If a four-stage counter is utilized, it is apparent that on the ninth count step pulse, the trigger 44 will be reset and the count will begin again with a count 1 in the trigger 11.

Figure 4:
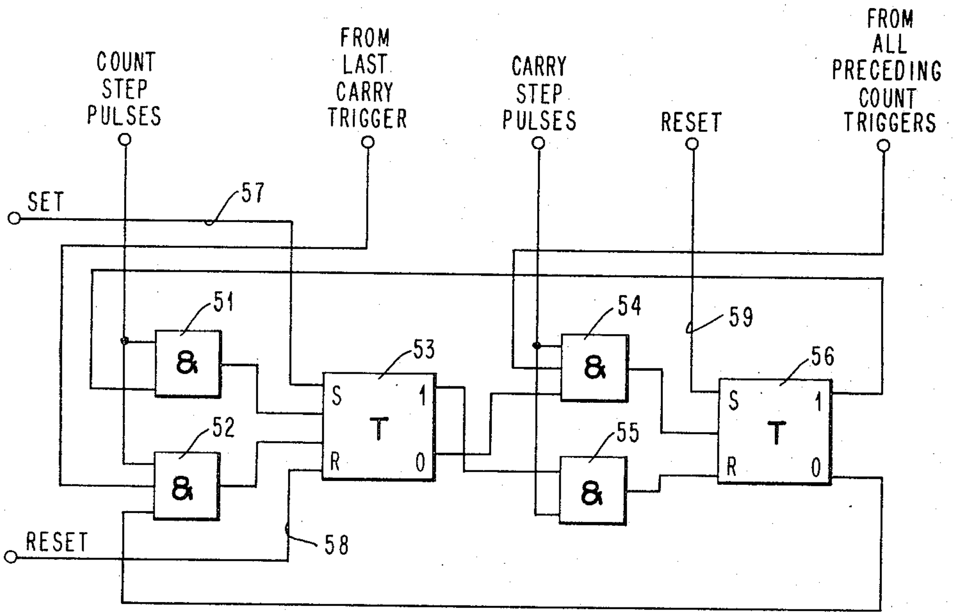
FIGURE 4 is a block diagram of a counter stage suitable for use in a step down counter.

As described, this counter is a count up counter. The counter can be modified to enable it to count down after a predetermined count is entered into it. Thus, in FIGURE 4, the AND gates 51 and 52 and the trigger 53 correspond to the count storage circuit and the AND gates 54, 55 and the trigger 56 to the carry storage circuit. The outputs from the trigger 53 are cross-connected and coupled into the AND gates 54 and 55 rather than being directly coupled as in the counter stages of FIGURE 1. Similarly, the outputs from the trigger 56 are directly coupled back to the AND gates 51 and 52, rather than being cross-connected as in the counter of FIGURE 1. The input from the last carry storage circuit is provided through the AND gate 52 to trigger 53 and the inputs from all preceding count storage circuits are provided through the AND gate 54 to trigger 56.

The count that is prestored in the storage circuits of the counter is provided through a set line 57 and a reset line 58 for the trigger 53 and through a reset line 59 for the trigger 56. Such connections could also be made for the step up counter of FIGURE 1. A counter employing stages of the type shown in FIGURE 4 operates in the same manner as the counter of FIGURE 1 except that with each count step pulse, the counter steps down from the preset count by one. Also, the first carry step pulse is provided to set the first carry storage circuit prior to the application of the first count step pulse to the counter.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A binary counter, comprising a plurality of counter stages connected in cascade, each counter stage including first and second binary circuits, a first source of pulses coupled to all of the first binary circuits, a second source of pulses operable alternately with the first source and coupled to all of the second binary circuits, the first binary circuit of each counter stage being connected to respond to the immediately preceding second binary circuit and the second binary circuit of each counter stage being connected to all of the preceding first binary circuits, and means coupled to the outputs of the first binary circuits to indicate the count after each of the pulses supplied from the first source of pulses.

2. The counter of claim 1, and further comprising means coupled to the outputs of the first binary circuits to indicate the complement of the count from the first source of pulses.

3. A binary counter capable of operating in step-up or step-down manner, comprising a plurality of counter stages connected in cascade, each counter stage including first and second binary circuits, a first source of pulses coupled to all of the first binary circuits, a second source of pulses operable alternately with the first source and coupled to all of the second binary circuits, the first binary circuit of each counter stage being connected to respond to the immediately preceding second binary circuit and the second binary circuit of each counter stage being connected to all of the preceding first binary circuits, means coupled to the respective binary circuits of the counter stages for presetting a count in the counter, and means coupled to the outputs of the first binary circuits to indicate the count in accordance with the count preset in the counter and the pulses supplied from the first source of pulses.

4. The counter of claim 3, wherein the first binary circuit of each stage is directly coupled to the second binary circuit of that stage and the second binary circuit is cross coupled to the first binary circuit of that stage enabling the counter to operate in step-up manner.

5. The counter of claim 3, wherein the first binary circuit of each stage is cross coupled to the second binary circuit of that stage and the second binary circuit is directly coupled to the first binary circuit of that stage enabling the counter to operate in step-down manner.

6. A binary counter, comprising a plurality of counter stages connected in cascade, each counter stage including first and second binary circuits, each binary circuit comprising first and second coincidence circuits and a storage circuit, the storage circuit of the first binary circuit being directly coupled through the coincidence circuits of the second binary circuit to its storage circuit and the storage circuit of the second binary circuit of each stage being cross coupled through the coincidence circuits of the first binary circuit to its storage circuit, the output of each storage circuit of each second binary circuit being connected to the first coincidence circuit of the first binary storage circuit of the next counter stage and the outputs of each storage circuit of each first binary circuit of each counter stage being connected to the first coincidence circuit of all of the following second binary circuits, a source of count pulses connected to the first and second coincidence circuits of each first binary storage circuit, a source of carry pulses connected to the first and second coincidence circuits of each second binary storage circuit, and connecting means coupled to the outputs of the storage circuits of the first binary circuits to indicate the count of pulses supplied from the source of count pulses.

References Cited

UNITED STATES PATENTS

| | | | |
|---|---|---|---|
| 3,022,003 | 2/1962 | Garrison | 235—92 |
| 3,041,476 | 6/1962 | Parker | 328—51 X |

MAYNARD R. WILBUR, *Primary Examiner.*

D. W. COOK, *Examiner.*

G. J. MAIER, *Assistant Examiner.*